(12) United States Patent
Cahill

(10) Patent No.: US 8,634,971 B2
(45) Date of Patent: Jan. 21, 2014

(54) BRAKE WEAR CONTROL SYSTEM

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 606 days.

(21) Appl. No.: 12/435,720

(22) Filed: May 5, 2009

(65) Prior Publication Data

US 2010/0286881 A1 Nov. 11, 2010

(51) Int. Cl.
*G06F 19/00* (2011.01)
*F16D 55/36* (2006.01)

(52) U.S. Cl.
USPC ............. 701/3; 701/83; 244/76 R; 244/75.1; 188/72.1; 188/1.11 W; 188/1.11 L; 188/71.5; 303/20; 303/126; 702/34

(58) Field of Classification Search
USPC ........ 701/70, 83, 29, 30, 3, 120; 73/146, 121; 188/72.1, 1.11 W, 71.5, 1.11 L; 303/20, 303/126; 702/34
See application file for complete search history.

(56) References Cited

U.S. PATENT DOCUMENTS

| | | | |
|---|---|---|---|
| 4,923,056 A * | 5/1990 | Nedelk | 188/71.1 |
| 5,752,747 A | 5/1998 | Decker et al. | |
| 6,003,640 A * | 12/1999 | Ralea | 188/71.5 |
| 6,008,604 A | 12/1999 | Maisch | |
| 6,256,570 B1 * | 7/2001 | Weiberle et al. | 701/70 |
| 6,302,241 B1 * | 10/2001 | Gronowicz, Jr. | 188/1.11 L |
| 6,604,708 B1 * | 8/2003 | DeVlieg | 244/111 |
| 6,702,069 B2 * | 3/2004 | Ralea et al. | 188/71.5 |
| 6,938,857 B2 * | 9/2005 | DeVlieg | 244/111 |
| 7,108,107 B2 * | 9/2006 | Ralea et al. | 188/1.11 L |
| 7,300,020 B2 * | 11/2007 | Steiner et al. | 244/111 |
| 2003/0029680 A1 * | 2/2003 | Ralea et al. | 188/71.5 |
| 2004/0084252 A1 * | 5/2004 | DeVlieg | 188/1.11 W |
| 2006/0144997 A1 * | 7/2006 | Schmidt et al. | 244/100 R |
| 2006/0206246 A1 * | 9/2006 | Walker | 701/16 |
| 2006/0226698 A1 * | 10/2006 | Riebe et al. | 303/20 |
| 2007/0013228 A1 * | 1/2007 | Lingman | 303/9.62 |
| 2007/0125607 A1 * | 6/2007 | Ralea et al. | 188/72.1 |
| 2007/0235267 A1 * | 10/2007 | Liebert | 188/1.11 L |
| 2008/0030069 A1 * | 2/2008 | Griffith et al. | 303/20 |
| 2008/0071432 A1 * | 3/2008 | Devlieg et al. | 701/3 |
| 2008/0119967 A1 * | 5/2008 | Long et al. | 701/3 |
| 2008/0275599 A1 * | 11/2008 | DeVlieg | 701/16 |
| 2009/0210126 A1 * | 8/2009 | Dellac et al. | 701/70 |
| 2010/0042267 A1 * | 2/2010 | Goodman et al. | 701/3 |
| 2010/0200341 A1 * | 8/2010 | Matsubayashi | 188/71.7 |

OTHER PUBLICATIONS

GB; Search Report dated Jul. 20, 2010 in Application No. GB1004965.8.
GB; Examination Report received May 10, 2010 in Application No. GB1004965.8.

\* cited by examiner

*Primary Examiner* — Thomas Black
*Assistant Examiner* — Sara Lewandroski
(74) *Attorney, Agent, or Firm* — Snell & Wilmer, L.L.P.

(57) ABSTRACT

A system, apparatus and method provide a means for managing wear of brake friction material such that even friction material wear is experienced between brakes. The available friction material of each brake is monitored to determine an amount of wear. Based on the amount of wear, a braking force applied by each brake may be varied to ensure even wear between brakes.

17 Claims, 5 Drawing Sheets

BRAKE WEAR CONTROL SYSTEM

FIELD OF THE INVENTION

The present invention relates generally to brake systems, and more particularly to a brake system for managing brake wear.

BACKGROUND

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuators that extend to compress the brake disk stack against the back plate. Torque is taken out by the stator disks through a static torque tube or the like.

Each stator disk includes a friction material that engages the rotor disk as the brake disk stack is compressed, thereby converting kinetic energy into heat energy. As a result of the conversion process, the friction material undergoes wear and, thus, the friction material requires periodic maintenance to determine if the friction material is worn out or otherwise requires replacement.

Friction material wear occurs not only when the brakes are applied during a landing stop of an aircraft, but also when the brakes are applied during a taxi stop. In many instances, a taxi stop subjects the friction material to more wear than landing stops.

Present day brake systems have employed wear pin indicators to measure overall wear of friction material in a brake disk stack. In such systems, brake wear is indicated, for example, by the length of the pin relative to a reference plate. This arrangement requires a visual inspection of the pin to determine wear and is inherently imprecise.

U.S. Pat. No. 7,108,107 to Ralea provides a system for electrically measuring brake wear in a brake actuator assembly. As the brake disks wear, the collective axial thickness thereof will decrease. The system includes an electric transducer which detects a change in the thickness of the brake stack in order to provide an indication of brake wear.

SUMMARY OF INVENTION

Aircraft brakes are not only used to stop the aircraft, but also to steer the aircraft during taxing. As a result, brake wear may be uneven between landing gear. Further, due to differences between brakes (e.g., tolerances, exposure to the elements, variations in the coefficient of friction, differences in wear characteristics, etc.), brakes on the same landing gear may experience different wear rates. This can be problematic, as the brakes require more frequent inspections and maintenance than if they wore evenly. The increased number of inspections not only adds cost associated with maintenance personnel, but the inspections also can prevent use of the aircraft, resulting in lost revenue.

The present invention provides a system, apparatus and method for managing wear of brake friction material such that consistent, controlled and patterned friction material wear is experienced between brakes. More particularly, the available friction material of each brake is monitored to determine an amount of wear. Based on the amount of wear, a braking force applied by each brake may be varied to ensure even wear between brakes. For example, a first brake having little friction material wear may be commanded to apply a greater braking force than a second brake having significant friction material wear.

According to one aspect of the invention, a brake controller for managing friction material wear for each of a plurality of brakes is provided. The controller is configured to receive data indicative of available friction material at each of the plurality of brakes and selectively vary a force applied by each brake as a function of the available friction material to maintain the available friction material for each brake within a predetermined range of one another.

The controller can be configured to determine, based on data indicative of available friction material, which brakes have the most available friction material and which brakes have the least available friction material. Then, during braking the controller can vary the force applied by brakes with the most available friction material relative to the force applied by brakes with the least available friction material. Additionally, to vary the force applied by brakes with the most available friction material, the controller can be configured to calculate a preliminary brake command signal generic to all brakes. The controller can then add or subtract a predetermined offset to the preliminary brake command signal for brakes corresponding to the most available friction material, and subtract or add the same offset to the preliminary command signal for brakes corresponding to the least available friction material. The controller can also be configured to predict when the friction material for each brake will require replacement or maintenance.

According to another aspect of the invention, a braking system is provided that includes the brake controller for managing brake wear and a plurality of brakes, with each brake including a friction material. The system also can include wear sensors operative to provide data indicative of available friction material, wherein the wear sensors are communicatively coupled to the controller.

The controller can be configured to manage wear of the friction material on each landing gear independent of wear of friction material on other landing gear. Alternatively, the controller can be configured to manage wear of the friction material across at least two landing gears.

According to another aspect of the invention, a method is provided for managing friction material wear on a plurality of brakes, where each brake includes a brake disk stack and at least one actuator for applying and releasing braking force. The available friction material for each brake of the plurality of brakes is monitored, and then a force applied by each brake is selectively varied to maintain the available friction material for each brake within a predetermined range of one another. Selectively varying the force can include determining which brakes have the least available friction material and which brakes have the most available friction material. Then, brakes with the most available friction material are commanded to apply a greater force than the force commanded for brakes with the least available friction material.

Varying the brake force can include calculating a preliminary brake command signal generic to all brakes. Then, a predetermined offset can be added or subtracted to the preliminary brake command signal for brakes corresponding to the most available friction material. Monitoring the available friction material can include measuring a thickness of the friction material for each brake and calculating the available friction material based on the measured thickness and a predetermined thickness.

Additionally, the method can include predicting when the friction material for each brake will require replacement or maintenance, as well as managing wear by instructing movement of at least one brake from one landing gear to another landing gear to allow for a consistent level of wear.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

The principles of the invention will now be described with reference to the drawings. Because the invention was conceived and developed for use in an aircraft braking system, it will be herein described chiefly in this context. However, the principles of the invention in their broader aspects can be adapted to other types of braking systems, such as automobile brakes, truck brakes, etc where wear is managed on the front and back of brakes.

As noted above, a problem with conventional brake systems, such as aircraft brake systems, is that the friction material for one or more brakes may wear at a different rate than that of other brakes. As used herein, friction material refers to the consumable portion of the brake that is used to convert kinetic energy into heat energy and may include a carbon material, steel, ceramic, etc.

Figure 1:
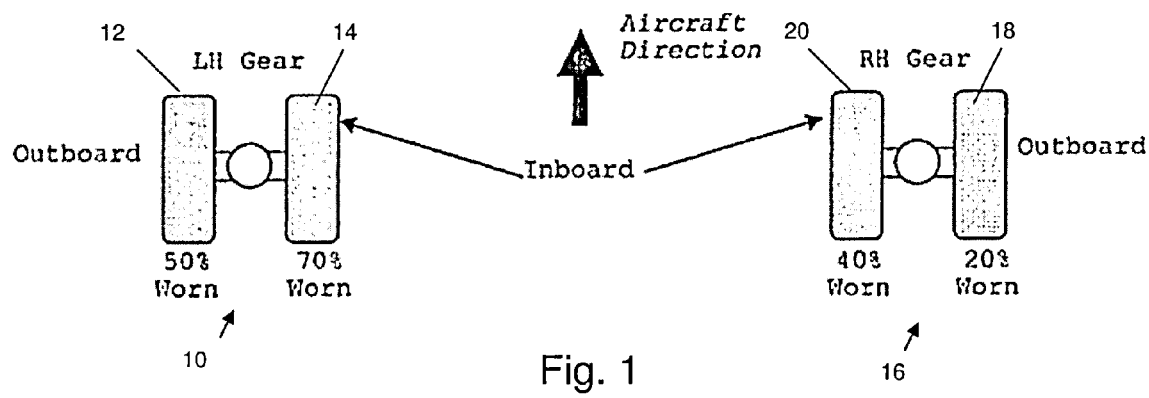
FIG. 1 is a schematic diagram of exemplary twin landing gear having brakes with varying amounts of available friction material.

With reference to FIG. 1, there is shown two exemplary twin landing gears 10 and 16 having different amounts of available friction material for each brake. Because the brake friction material has worn unevenly, maintenance will be required on the brakes at different times. As shown, the friction material for each inboard wheel 14 and 20 has undergone more wear than the friction material for each outboard wheel 12 and 18. Further, based on the available friction material for each brake, it is likely that the respective friction material will wear out at different times.

The system, apparatus and method in accordance with the present invention alleviates this problem by managing friction material wear between brakes such that wear is consistent, controlled and patterned. More particularly, the available friction material of each brake is monitored and a determination is made with regard to the available friction material for each brake. Based on the determination, a force applied by one or more brakes is varied relative to other brakes (e.g., the force applied by one brake may be greater than or less than the force applied by other brakes) so the friction material is worn at the same rate. Preferably, the braking force applied by each brake is varied during a taxi stop, although it is possible to vary the force during a landing stop, provided full braking force from all brakes is not required. By allowing the friction material of the brakes to be worn at the same rate, the system, apparatus, and method can lessen the variation of torque of the brakes by allowing the braking burden to be better distributed.

The system, apparatus and method in accordance with the invention can be configured such that all the brakes on the aircraft wear out at about the same time, or the brakes on one or more landing gear wear out at about the same time. In other words, the wear of the friction material can be managed on each landing gear independent of the wear of friction material on other landing gear, or the wear of the friction material can be managed across at least two landing gears, including a center landing gear.

The system, apparatus and method in accordance with the present invention will be described in the context of electrically operated brakes. However, it is to be understood that use of electrically operated brakes is merely exemplary, and the principles in accordance with the present invention may be applied to other types of brakes, including hydraulically operated brakes and pneumatically operated brakes.

Figures 2A, 2B:
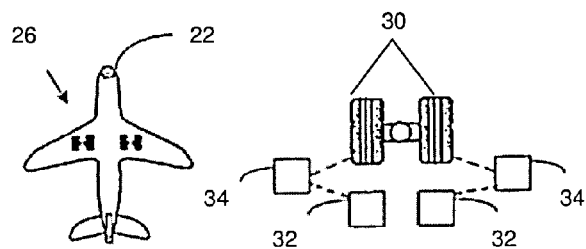
FIGS. 2A and 2B are schematic diagrams illustrating an exemplary aircraft having twin landing gear.
Figures 3A, 3B:
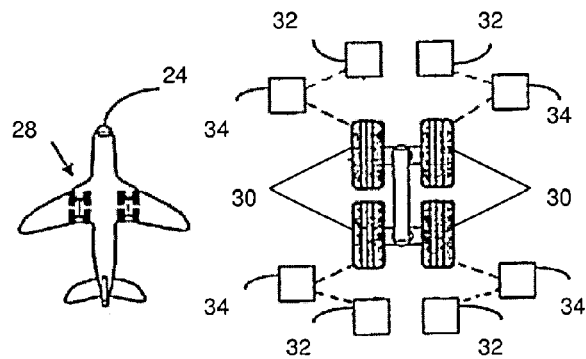
FIGS. 3A and 3B are schematic diagrams illustrating an exemplary aircraft having bogie landing gear.

Referring to FIGS. 2A and 3A, there is shown exemplary aircraft 22 and 24 having twin landing gear configuration 26 and bogie landing gear configuration 28, respectively. The exemplary twin landing gear configuration 26 includes four main wheels and the exemplary bogie landing gear configuration 28 includes eight main wheels. As will be appreciated by those having ordinary skill in the art, other configurations are possible, e.g., six-wheel bogie gears, two wheels on a "twin" gear, two wheeled aircrafts, etc. The method and device described herein can be applied to any aircraft/gear configuration.

With further reference to FIGS. 2B and 3B, each wheel 30 on the landing gear includes a wear sensor 32 and brake 34 (each wheel, brake and corresponding wear sensor is collectively referred to as a wheel/brake/sensor combination). The brake 34 may be an electrically operated brake that includes a brake disk stack, a brake head, and at least one actuator mounted to the brake head. The actuator can include a housing, a reciprocating ram and a motive device operatively connected to the reciprocating ram for selectively moving the reciprocating ram into and out of forceful engagement with the brake disk stack for applying and releasing a braking force.

Figure 4:
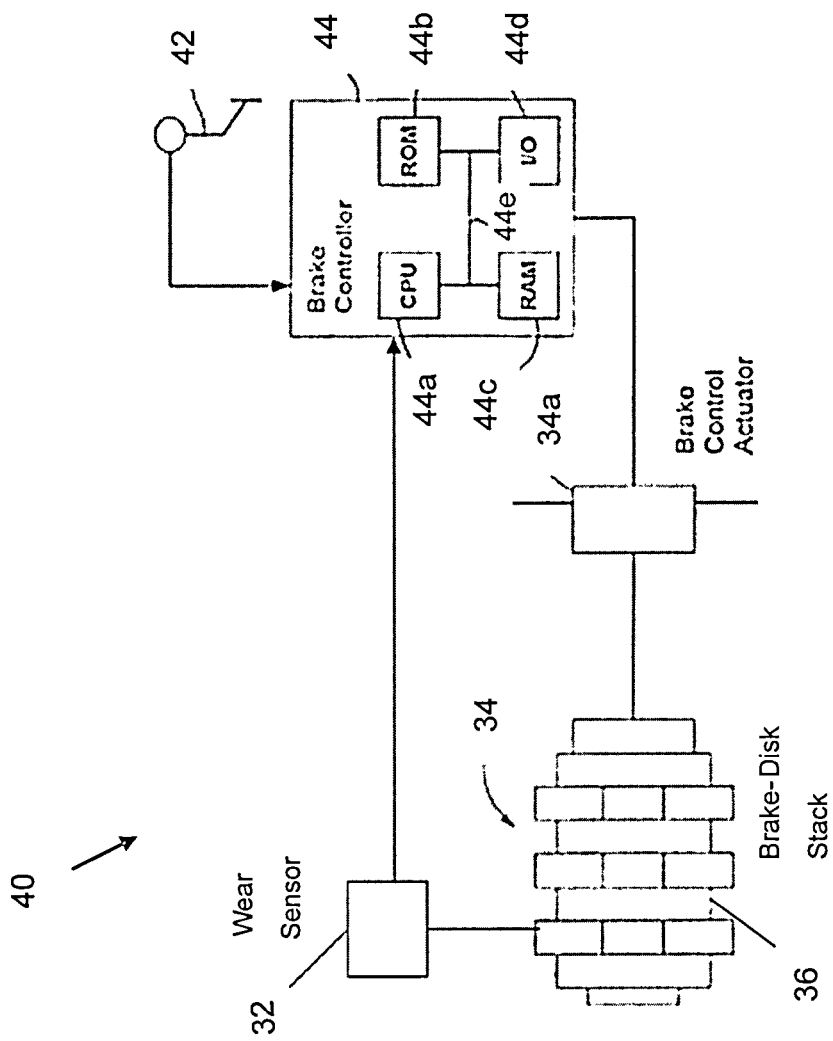
FIG. 4 is a schematic diagram of an exemplary brake control system in accordance with the invention.

Referring to FIG. 4, a schematic diagram of an exemplary aircraft brake system 40 in accordance with the invention is shown. The system 40 includes at least one brake pedal 42 located in the cockpit, wherein the at least one brake pedal 42 generates a signal indicative of an amount of force to be applied collectively to the plurality of brakes 34. The signal generated by the at least one brake pedal 42 is provided to a brake controller 44, which also receives data relating to brake wear from a plurality of wear sensors, each corresponding to a brake. Although only a single wear sensor 32 and brake 34 are shown in FIG. 4, it should be appreciated that the controller 44 receives data from multiple wear sensors and provides brake commands to multiple brakes.

As described in more detail below, the brake controller 44, based on the data from the plurality of wear sensors 32 and the brake pedal signal, selectively commands an actuator 34a of at least one brake to vary an applied force to the brake-disk stack 34 relative to the commanded force provided to actuators for other brakes so as to maintain the available friction material 36 of each brake 34 within a predetermined range of one another. Preferably the range is 0.5%, more preferably, 0.1% of the total thickness of new friction material.

The brake controller 44 can include a microprocessor 44a, read only memory (ROM) 44b, random access memory (RAM) 44c, and input/output module 44d, each of which are communicatively coupled via a system bus 44e or the like. A braking program can reside in ROM 44b and can be executed by the microprocessor 44a so as to implement a braking function as described herein. The brake controller 44 is operatively coupled to a brake actuator 34a of each brake 34. Exemplary brake actuators include one or more servo valves, electric motors, and their associated controllers, or the like. Based on a braking command from the at least one pedal 42 and data relating to the brake wear as provided by the wear sensors 32, the braking controller 44 provides a signal to each brake actuator 34a so as to provide a braking function and manage wear of the friction material 36.

The wear sensors 32 can be electrical wear sensors, such as LVDT sensors or the like, and can provide a signal indicative of the thickness of the brake-disk stack. The signal provided by the wear sensors 32 may be an analog signal (e.g., a 0-5 VDC signal or a 4-20 mA signal), or a digital signal communicated via a communication bus. Data from the wear sensors 32 may be directly provided to the brake controller 44, or an intermediate device, such as a data concentrator, may be used to provide the data to the brake controller 44.

The wear sensors 32 can be operatively coupled to the brake-disk stack so as to provide data indicative of the thickness of the entire brake-disk stack. Alternatively, the wear sensors can be configured to provide data indicative of actuator position (e.g., the position of the reciprocating ram within its normal travel). Based on the change in actuator position over time, the thickness of the brake-disk stack (and thus the friction material for each stator) can be calculated.

Figure 5:
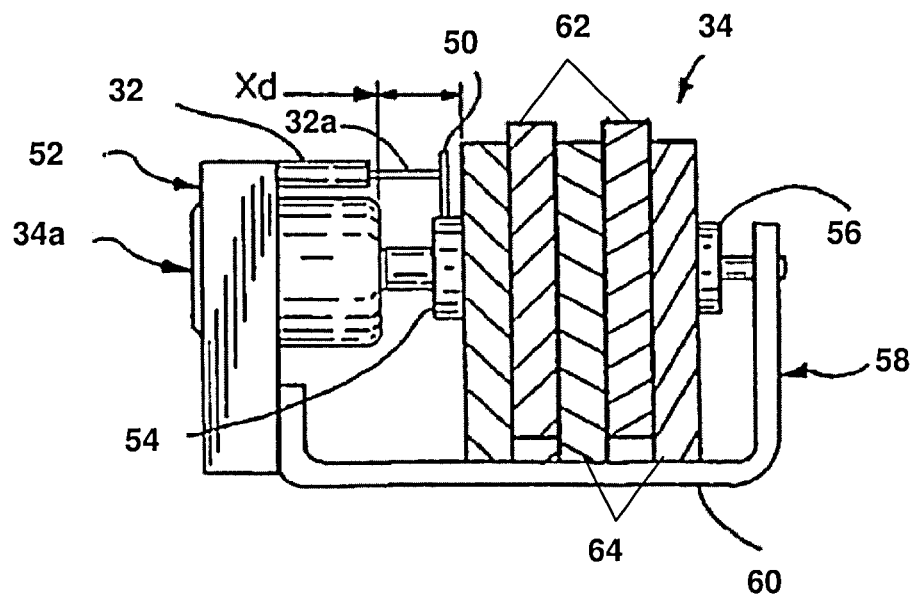
FIG. 5 is a schematic diagram of a wear sensor that can be used in the system of FIG. 4.

Referring to FIG. 5, there is shown an exemplary wear sensor that may be used to provide data indicative of friction material wear. More particularly, a brake actuator assembly includes a housing 52 that provides for the mounting of an electromechanical actuator 34a, it being understood that typically multiple actuators will be mounted to the housing, such as four functionally identical actuators located at respective quadrants of the housing. A ram 54 of each actuator (or a piston of a hydraulic brake system) is mechanically connected to an LVDT position sensor 32, such as by bracket 50. An LVDT armature 32a may be adjustably attached to the bracket (or the sensor body to the brake housing) by suitable means that provides for LVDT setting and position calibration. A cover (not shown), or the like, may be provided to protect for the LVDT mounting mechanism. Although an LVDT sensor is preferred, other types of position sensors/transducers may be used as desired for the particular application.

The brake disk stack 34 includes alternating rotor disks 62 and stator disks 64 (the stator disks 64 include friction material 36) mounted with respect to a torque tube 60 or similar member and the wheel (not shown) for relative axial movement. Each rotor disk 62 is coupled to the wheel for rotation therewith and each stator disk 64 is coupled to the torque tube 60 against rotation. A back plate 58 is located at the rear end of the brake disk stack and functions as a force reaction member via the reaction plate 56. The brake actuator 34a is mounted to the brake housing 52 fixed with respect to the torque tube 60. The ram 54 of the actuator extends to compress the brake disk stack 34 against the back plate 58, and torque is taken out by the stator disks 64 through the static torque tube 60 (or the like).

The displacement of each actuator ram 54 is measured using the wear sensor 32 (zero displacement is assumed when the ram is compressing a new brake disk stack). As the friction material decreases, the collective axial thickness thereof will decrease, and the ram displacement will increase. Based on the ram displacement Xd as determined from data provided by the wear sensor 32, the available friction material for the brake disk stack 34 can be calculated. Further details regarding the wear sensor 32 and the determination of friction material wear can be found in U.S. Pat. No. 7,108,107, the contents of which is hereby incorporated by reference in its entirety.

Based on the data indicative of friction material wear/available friction material, the controller 44 is configured to selectively vary or alter a force applied by each brake 34 so as to maintain the available friction material 36 for each brake 34 within a predetermined range of one another. More particularly, the brake controller 44 is configured to determine, based on data from the plurality of wear sensors 32, which brakes 34 have the least available friction material 36 and which brakes 34 have the most available friction material 36. Then, during braking, the controller 44 can vary the force applied by the brakes 34 with the most available friction material 36 relative to the force applied by the brakes 34 with the least available friction material 36 (e.g., the controller can create a force differential between brakes). In this manner, the friction material 36 of each brake 34 can be worn so that the brakes 34 wear evenly, while at the same time provide the total requested braking force. When varying the force, the controller 44 can estimate the energy received by each brake 34 so that one or more brakes do not overheat. The controller 44 can further limit the change in braking force so that the aircraft does not experience too much yaw. In some instances, an algorithm using a control pattern that assumes brake wear increases or decreases as brake force increases or decreases, the opposite may actually be true, e.g., brake wear increases as brake force decreases. This is particularly true when performing repeated taxi stops on brake systems that employ carbon brakes. To compensate for such situations, the algorithm can adapt and switch the control pattern to vary the force applied to compensate for the disproportionate wear.

In determining the force differential to be applied between brakes, the controller can analyze the friction material available for each brake, the requested brake command (e.g., how much braking is being requested by the pilot), and the particular circumstances of the aircraft (e.g., is the aircraft landing, taxiing, turning, etc.). As described in more detail below, the controller 44, based on the available friction material, braking request and vehicle circumstances, formulates a command signal indicative of a braking force to be applied by each brake, wherein the command signal for brakes with more available friction material is intentionally varied relative to command signals for brakes with less available friction material (e.g., brakes with the most available friction material perform more work than brakes with the least amount of friction material). The brake controller then provides the command signals to the actuators corresponding to the respective brakes, whereby the actuators (e.g., a motor, servo valve, etc.) cause a braking force to be applied by the brakes.

The force differential between brakes can be based on several factors, including the relative difference in available friction material, the type of stop (e.g., taxi, landing), the amount of brake pressure, etc. For example, during a taxi stop, brakes with the least amount of available friction material may not be used at all (or used minimally). Further, the force differential between brakes may be proportional to the differential of available friction material between brakes. For example, assume a brake-disk stack having four stators, each stator having one inch of friction material when new. Further, assume that brake A is worn ten percent (ninety percent available) and brake B is worn thirty percent (seventy percent available). Thus, brake A has twenty eight percent more friction material than brake B (e.g., 100*(0.9 inches−0.7 inches)/ 0.7 inches). Then if the pilot requests a total braking force of fifty percent (e.g., the brake pedal is displaced halfway to the floor), the force commanded to brake A can be increased (or decreased) by fourteen percent (e.g., sixty-four percent of full force), and the force commanded to brake B can be decreased (or increased) by fourteen percent (e.g., thirty-six percent of full force). This will result in the approximately the same total braking force as commanded by the pedal (i.e., fifty percent total), yet, due to the force differential between brake A relative to brake B, the friction material for brake A will wear faster than the friction material for brake B.

It is noted that for sake of simplicity the above example assumes a linear relationship between the applied brake force and the actual brake wear. In actual practice, the relationship between the applied brake force and the actual brake wear may be non-linear. To take into account such non-linear wear, conventional brake wear models can be stored in the controller and used to estimate the actual wear of the friction material.

In yet another variation, if the commanded braking pressure (e.g., the braking request as provided by the brake pedal) is low, brakes with the least amount of available friction material may not be used, while if braking pressure is high, all brakes may supply about the same braking force. If a landing stop is taking place (as opposed to a taxi stop), the brake wear management may be disabled, or the force differentials between brakes may be limited to be significantly less than during a taxi stop.

Alternatively, instead of calculating a force differential between the brakes 34, a simple fixed differential can be used to generate the force differential to allow the brakes to wear out at the same time. For example, a fixed differential of ten percent can be implemented, wherein brake commands for brakes with the most available friction material are increased (or decreased) by five percent, and brake commands for brakes with the least amount of friction material are decreased (or increased) by five percent. Further, the fixed differential can be based on the requested braking (e.g., if the braking request is low or below a predetermined threshold, then the differential may be five percent, and if the braking request is high (e.g., above the predetermined threshold), the differential can be ten percent. If the friction material cannot be worn so that all the brakes wear out at the same time or if such action is not desired, then one or more of the plurality of gears/brakes can be intentionally worn out before the rest of the gears/brakes.

In addition to providing even friction material wear between brakes, the brake controller also can provide information corresponding to when the friction material for each brake 34 will wear out, and further allows for optimized usage of each brake 34. By better understanding brake wear, airline routes can be optimized and an efficient use of maintenance can be implemented.

Further, by predicting when the friction material will wear out, time and money associated with maintenance inspections can be minimized. Since the amount of wear per unit of time or per braking event is small in comparison to the overall brake wear, the prediction can be made using a simple control algorithm. The algorithm can look at information such as braking force, velocity, estimated landing weight, brake temperature, pressure, distance, reverse thrust, flaps, spoilers, etc. along with information from the wear sensors.

To predict when the friction material on the brakes will require service, the algorithm, based on data from the wear sensors 32, can determine the average wear as a function of stops. Based on average wear per stop or the rate of wear after multiple stops, and the known amount of available friction material, the algorithm can predict when the friction material will wear out. For example, if it is determined that the percentage of available friction material is approximately 50% for each brake, and the algorithm has determined that per stop there is 0.06% friction material wear (having approximately 20 applications per stop), then it can be predicted that the friction material will wear out in approximately 833 stops. This information can be communicated to the flight crew and/or maintenance personnel, who then can take appropriate action.

Figure 6:
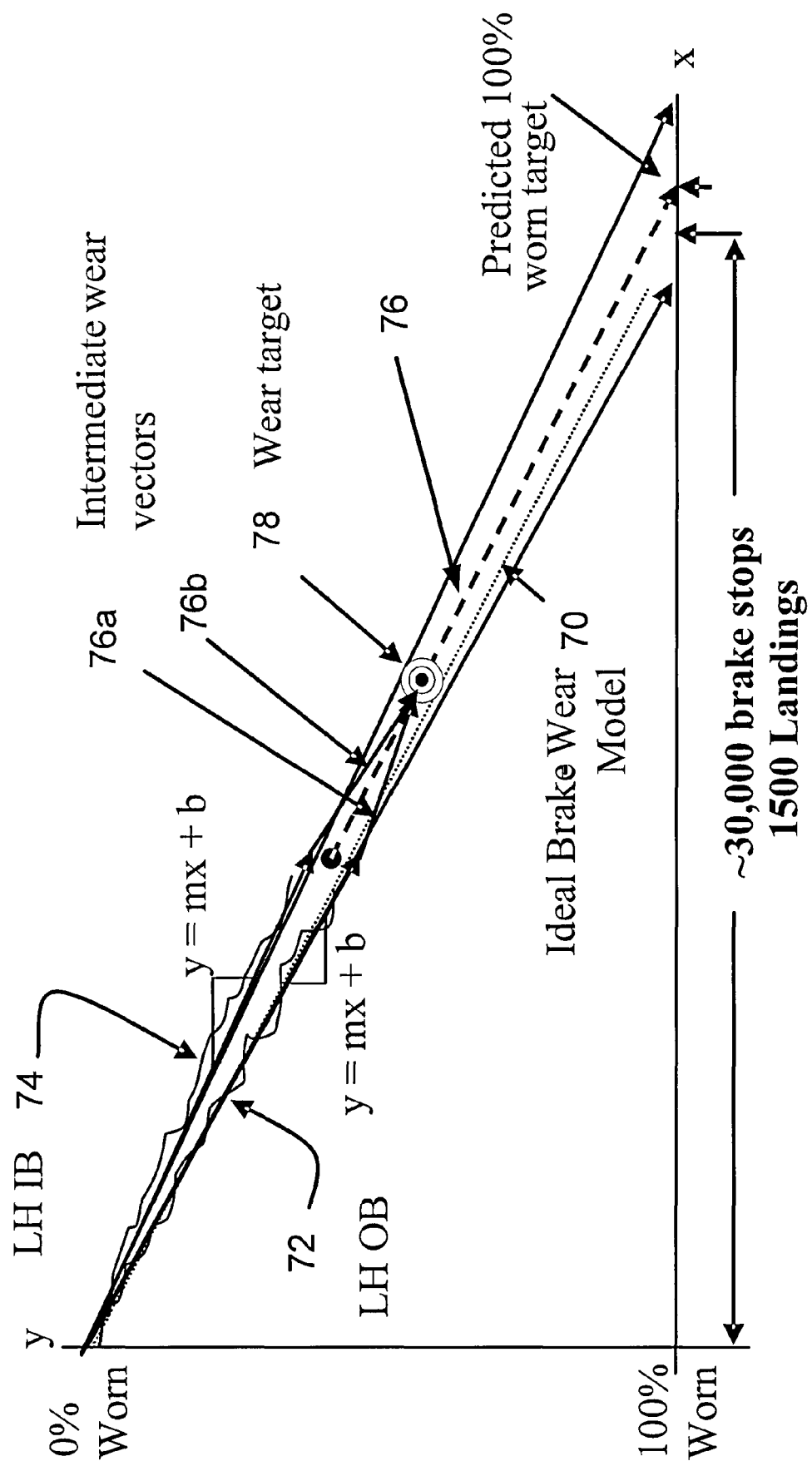
FIG. 6 is an exemplary graph showing brake wear relative to number of brake stops.

An exemplary graph is shown in FIG. 6, which provides an illustration of a prediction for when the friction material on the brakes will require service. The wear of the brakes is shown by the slope of a line, determined by using the equation for slope of a line, $y=mx+b$, where y represents the amount the brake is worn and x represents the number of landings. In this example the ideal brake wear model determined by the equation is shown at 70. The brakes in the example are expected to last approximately 1500 landings, having approximately 20 applications per landing. The graph illustrates brake wear management on a single landing gear having two brakes, a left hand outboard brake and a left hand inboard brake. The wear of the left hand outboard brake is represented as 72 and the wear of the left hand inboard brake is represented as 74. When these brakes were put into service the algorithm was not in use, as such a difference in the wear of the brakes would not occur if it had been used. When the algorithm begins to manage the wear, the wear of the left and right hand brakes 72 and 74 begins to equal out, illustrated by intermediate wear vectors 76a and 76b. Based on the intermediate wear target 78, the left hand inboard brake needs to be worn more and the left hand outboard brake needs to be worn less. The prediction of when the left hand outboard and inboard brakes will require service is shown by line 76, although line 76 is not a static target wear vector.

Upon installation, the algorithm can immediately begin to manage the wear of the brakes by aligning the wear vectors 76a and 76b to the new vector 76 within the constraints of the system and not simply by managing the brake wear based on the end desired result (e.g. a single brake on a gear can only absorb so much energy without getting too hot and blowing the fuseplug in the wheel, resulting in a loss of tire pressure and the aircraft wheel/tire needing changed). The algorithm can work continuously and adapt over time to modify operation to allow all the brakes to be worn out at the same time. Additionally, energy estimates can be made using aerodynamic energy losses, tire losses, etc. to estimate the energy the brakes will absorb to provide energy margins to be used in managing brake wear. The algorithm can work from multiple scenarios, such as when a new brake is installed but the remaining brakes are half worn, to develop and predict the friction material wear based on the data mentioned above.

The algorithm also can take into account variables which may lead to more/less friction material wear, such as weight of the vehicle, velocity, environmental variables, friction material properties, the coefficient of friction for the friction material, brake pressure, brake temperature, etc. Additional factors leading to more/less friction material wear are the wheels, tires, brakes, landing gear, etc. The flexibility of the algorithm to take these variables into account allows the operational constraints to change over the life of the brakes (e.g., if fuel prices rise drastically, airlines may not use reverse thrust as much as they previously had, thereby increasing brake wear; or rules may be used such as not managing brake wear during stops over a certain speed). The algorithm is also able to easily adjust itself over the life of service based on time and brake wear adjustment data, without having to correctly manage each brake for each brake application.

As mentioned above, FIG. 1 provides an example of brakes on twin landing gears having different amounts of available friction material 36. The exemplary brake controller 44 in accordance with the present invention is configured to correct the difference in available friction material 36 of the brakes 34. It is noted that although the example is for a plane having twin landing gear, wear can be managed on any type of landing gear or vehicle with any percentage of friction material wear.

Left-hand landing gear 10 has two wheels, outboard wheel 12 and inboard wheel 14. Wear sensors 32 provide data indicative of friction material thickness/wear of the brakes 34 on outboard wheel 12 and inboard wheel 14, and this data can be used to calculate the available friction material. In the example of FIG. 1, the friction material on the brake attached to outboard wheel 12 is 50% worn while the friction material on the brake attached to inboard wheel 14 is 70% worn. The next time a braking event occurs, the controller 44 receives a brake reference signal from the pedal and outputs a command to the brakes 34, wherein the command varies the amount of force applied to the brakes based on the available friction material 36. Because the outboard wheel 12 has more available friction material, the controller 44 varies the force applied by the brake corresponding to the outboard wheel relative to the force applied by the brake corresponding to the inboard wheel, e.g., a higher force is applied by the brake corresponding to the outboard wheel relative to the brake corresponding to the inboard wheel. In this way, the friction material of the brake on the outboard wheel 12 and inboard wheel 14 can be managed to wear out at the same time.

Similarly, wear sensors 32 provide data indicative of the thickness of the friction material of the brakes 34 on outboard wheel 18 and inboard wheel 20 of the right-hand landing gear 16, and this data also can be used to calculate the available friction material. In this example, the friction material on the brake attached to outboard wheel 18 is 20% worn while the friction material on the brake attached to inboard wheel 20 is 40% worn. As discussed above, because the outboard wheel 18 has more available friction material, the controller 44 varies the force applied by the brake corresponding to the outboard wheel 18 relative to the force applied by the brake corresponding to the inboard wheel (e.g., a higher force is applied by the brake corresponding to the outboard wheel relative to the force applied by the brake corresponding to the inboard wheel). In this way, the friction material of the brake on the outboard wheel 18 and inboard wheel 20 can be managed to wear out at the same time.

The controller can vary the force applied to the friction material of each landing gear separately or at the same time. As above mentioned, the signal sent by the controller will generally be equally divided among the left-hand and right-hand gears. For example, where there are two landing gears as shown in FIG. 1, each gear will receive about 50% of the braking force of the aircraft. If this is the case, managing the friction material wear across both landing gears would be done the same way as it would if the friction material wear was managed individually. Although the force generally needs to be equal among the sides of the aircraft, the amount of force applied to the inboard and outboard brakes does not have to be equal (e.g., via modulation of the braking force, there can be a slight differential between the force applied between landing gear without significantly affecting control). This allows for the management of the friction material across the whole aircraft. If the desired wear management is not achievable, the cockpit, maintenance, etc. can be notified and the system can recommend which brakes to move to what positions. When the aircraft is turning, the brake forces on the sides of the aircraft will be different. In this instance, large discrepancies in friction material between sides of the aircraft can be corrected by applying more force to brakes that have more available friction material relative to brakes with less friction material.

In a method for managing friction material wear on a plurality of brakes, the available friction material for each brake of the plurality of brakes is monitored and a force applied by each actuator is selectively varied so as to maintain the available friction material for each brake within a predetermined range of one another.

The method described herein may be implemented in the computer controller 44, for example, so as to carry out or supplement friction material management of the vehicle. For example, a computer program may be loaded into memory of the controller and, when executed by the controller, friction material management described herein is executed. Alternatively, logic for implementing the method may be created hardware (e.g., in an ASIC). Such a controller may be located in the avionics bay of an aircraft, for example, and operatively coupled to the brake actuators and wear sensors on the landing gear, and to a brake pedal in the cockpit.

Figure 7:
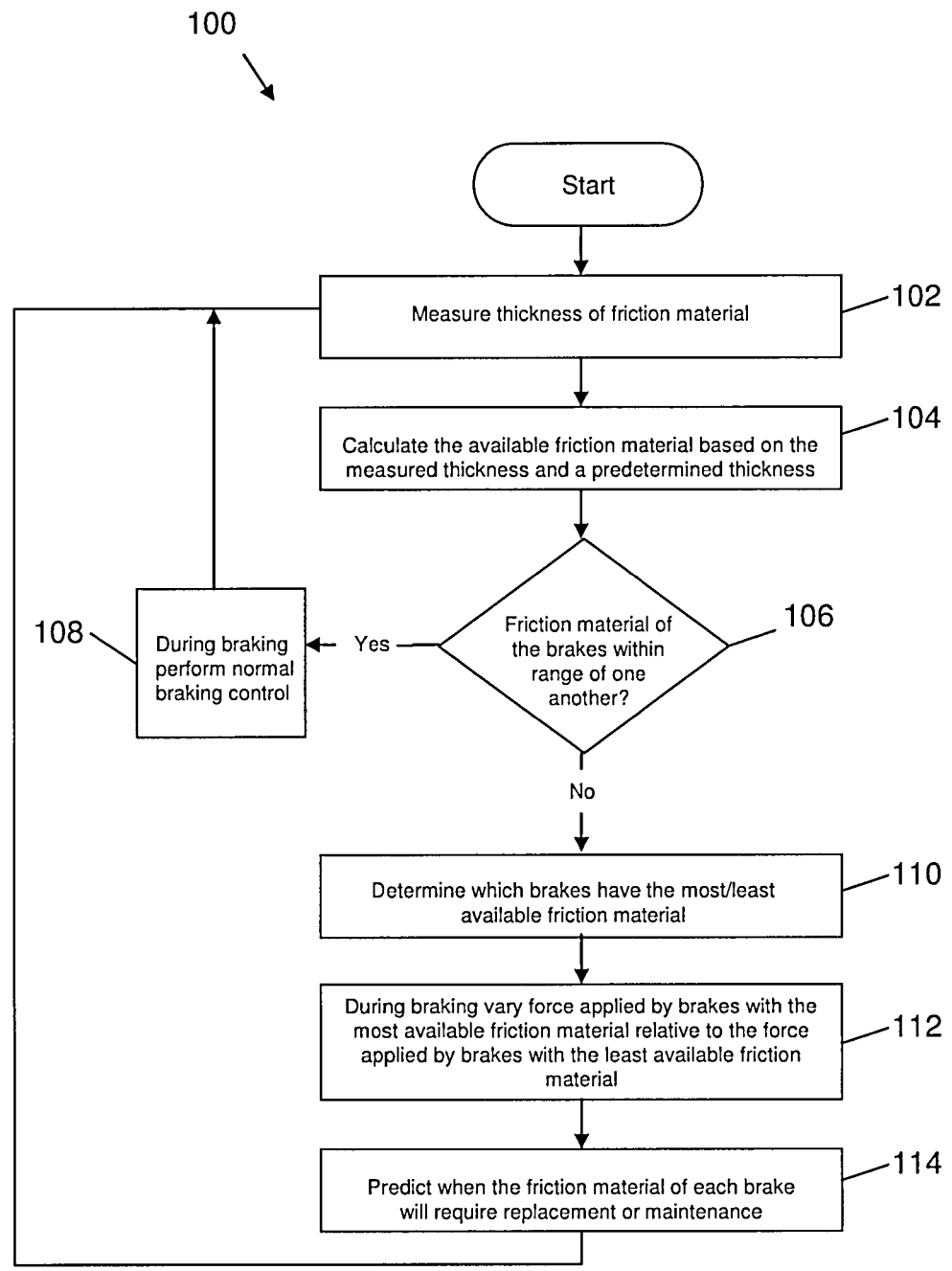
FIG. 7 is a flow chart illustrating exemplary steps for implementing brake wear control in accordance with the invention.

Referring now to FIG. 7, a flow diagram 100 illustrating an exemplary method for implementing brake wear control is provided. The flow diagram includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at block 102, the wear sensors 32 provide data indicative of the thickness of the friction material of the brakes. The data can be used to determine friction material wear as a function of time, stops, etc. This can be accomplished, for example, by using the LVDT sensor 32 as shown in FIG. 5. Next at block 104, the available friction material of the brakes is calculated based on the data from the wear sensors (e.g., based on a calculated thickness of each stator relative to an initial thickness). The initial thickness of the friction material for each brake is stored in memory 44b of the controller 44 and retrieved when needed.

For example, if Xref is the predetermined thickness of the friction material and Xd is the measured thickness of the friction material, the difference between the two can be determined and would represent the available friction material of the brake. If desired, the difference in friction material from one braking application to the next could be calculated based on the measured thickness of the friction material and the previously measured thickness of the friction material. This information could be used when predicting when the friction material will wear out by determining the amount of wear of the friction material for each stop and then determining the average amount of wear of the friction material per stop.

Next at block 106, a check is performed to see if the friction material of each brake is within a predetermined range of the friction material on the other brakes. This can be done for brakes on each landing gear or across multiple landing gears. If the friction material of the brakes being compared is within the predetermined range of one another, then at block 108 normal braking will occur and the method moves back to block 102. However, if the friction material on the brakes is not within the predetermined range of other friction material, then at block 110 it is determined which brakes have the least available friction material and which brakes have the most available friction material. This can be accomplished by simply comparing the levels of available friction material calculated at block 104 of the brakes to one another and determining which brake(s) have the most available friction material.

Next at block 112, during braking, the force applied by the brakes with the most available friction material is varied relative to the force applied by the brakes with the least available friction material. Varying the force can include calculating a preliminary brake command signal generic to all brakes, and adding or subtracting a predetermined offset to the preliminary brake command signal provided to the brakes corresponding to the most available friction material and subtracting or adding the same offset to the preliminary brake command signal provided to the brakes corresponding to the least available friction material (if force is added for brakes with the most friction material, the force is subtracted for brakes with the least amount of friction material, and vice-versa).

At block 114, a prediction is made to determine when the friction material for each brake will require replacement or maintenance. A determination can be made of the wear rate of the friction material based on parameters like time, usage or other operational or aircraft parameters. Considerations such as weight, landing speed and reverse thrust also may be taken into account when determining the rate of wear per brake application. The wear rate of each gear position could also be determined. The wear rate can be represented as inches per landing, inches per application, etc. The determination can be reported to the cockpit, avionics, maintenance, maintenance connector, etc.

Another way of managing wear of the friction material is to move at least one brake (or brake and wheel) from its position on one landing gear to a position on another landing gear. This will allow for a consistent level of wear of the brakes on one or more landing gear. A more worn brake can be moved to the location of a least worn brake, and in this manner the friction material can be managed where one brake was receiving more force in its particular location than the other brakes. This can be done if there is a problem managing the brakes by varying the force applied to each brake, or can be done in conjunction with varying the force.

Accordingly, a system, method and apparatus for managing brake wear of a vehicle, as described herein, can significantly reduce maintenance costs for airlines. Further, since less time is required for maintenance, the aircraft is available to generate revenue.

A person having ordinary skill in the art of computer programming and applications of programming for computer systems would be able in view of the description provided herein to program the BSCU to operate and to carry out the functions described herein. Accordingly, details as to the specific programming code have been omitted for the sake of brevity. Also, while software in the memory or in some other memory of the BSCU may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake controller for managing friction material wear for each of a plurality of brakes, said controller configured to:
   receive data indicative of available friction material at each of the plurality of brakes;
   selectively vary a force applied by each brake as a function of the available friction material to maintain the available friction material for each brake within a predetermined range of one another;
   a plurality of brakes, each brake comprising a friction material;
   a wear sensor operative to provide data indicative of available friction material, wherein the wear sensor is communicatively coupled to the controller; and
   a first aircraft landing gear, wherein the plurality of brakes correspond to the first aircraft landing gear,
wherein the controller is configured to manage wear of the friction material on the first aircraft landing gear, independent of a wear of friction material on a second aircraft landing gear.

2. The brake controller according to claim 1, the controller further configured to:
   determine, based on data indicative of available friction material, which brakes have maximum available friction material of the plurality of brakes and which brakes have minimum available friction material of the plurality of brakes; and
   during braking vary the force applied by brakes with the most available friction material relative to the force applied by brakes with the least available friction material.

3. The brake controller according to claim 1, wherein the controller, to vary the force applied by brakes with maximum available friction material of the plurality of brakes, is configured to calculate a preliminary brake command signal generic to all brakes, and add or subtract a predetermined offset to the preliminary brake command signal for brakes corresponding to the maximum available friction material of the plurality of brakes.

4. The brake controller according to claim 1, wherein the controller is further configured to predict when the friction material for each brake will require replacement or maintenance.

5. The brake controller according to claim 1, wherein the controller is further configured to manage friction material wear on front and rear brakes.

6. The braking system according to claim 1, wherein the brake further comprises: a brake disk stack; a brake head; and at least one actuator mounted to the brake head, the actuator including a housing, a reciprocating ram and a motive device operatively connected to the reciprocating ram for selectively moving the reciprocating ram into and out of forceful engagement with the brake disk stack for applying and releasing braking force.

7. The braking system of claim 1, wherein the friction material comprises at least one of a carbon, steel, or ceramic material.

8. A method of managing friction material wear on a plurality of brakes, each brake including a brake disk stack, and at least one actuator for applying and releasing braking force, comprising:
   monitoring available friction material for each brake of the plurality of brakes associated with a first aircraft landing gear and a second aircraft landing gear; and
   selectively varying a force applied by each brake to maintain the available friction material for each brake in the first aircraft landing gear within a predetermined range of one another, independent of a wear of friction material on the second aircraft landing gear.

9. The method according to claim 8, further comprising determining a wear rate of the friction material.

10. The method according to claim 8, wherein friction material wear is managed on an aircraft.

11. The method according to claim 8, wherein friction material wear is managed on front and rear brakes.

12. The method according to claim 8, wherein selectively varying the force comprises: determining which brakes have minimum available friction material of the plurality of brakes and which brakes have maximum available friction material of the plurality of brakes; and varying a force applied during braking by brakes with maximum available friction material of the plurality of brakes relative to a force applied by brakes with minimum available friction material of the plurality of brakes.

13. The method according to claim 12, wherein varying the brake force includes calculating a preliminary brake command signal generic to all brakes, and adding or subtracting a predetermined offset to the preliminary brake command signal for brakes corresponding to the maximum available friction material of the plurality of brakes.

14. The method according to claim 8, wherein monitoring the available friction material comprises: measuring a thickness of the friction material for each brake; and calculating the available friction material based on the measured thickness and a predetermined thickness 15. The method according to claim 14, wherein measuring the thickness includes using a wear sensor to provide data indicative of the thickness of the friction material.

16. The method according to claim 8, further comprising predicting when the friction material for each brake will require replacement or maintenance.

17. The method according to claim 8, wherein managing wear includes recommending that at least one brake be moved from one landing gear to another landing gear to allow for a consistent level of wear.

* * * * *